Nov. 1, 1932.  C. J. BRISTOL  1,885,984
GUIDE DEVICE FOR AUTOMOBILE LIFTS
Filed June 23, 1930
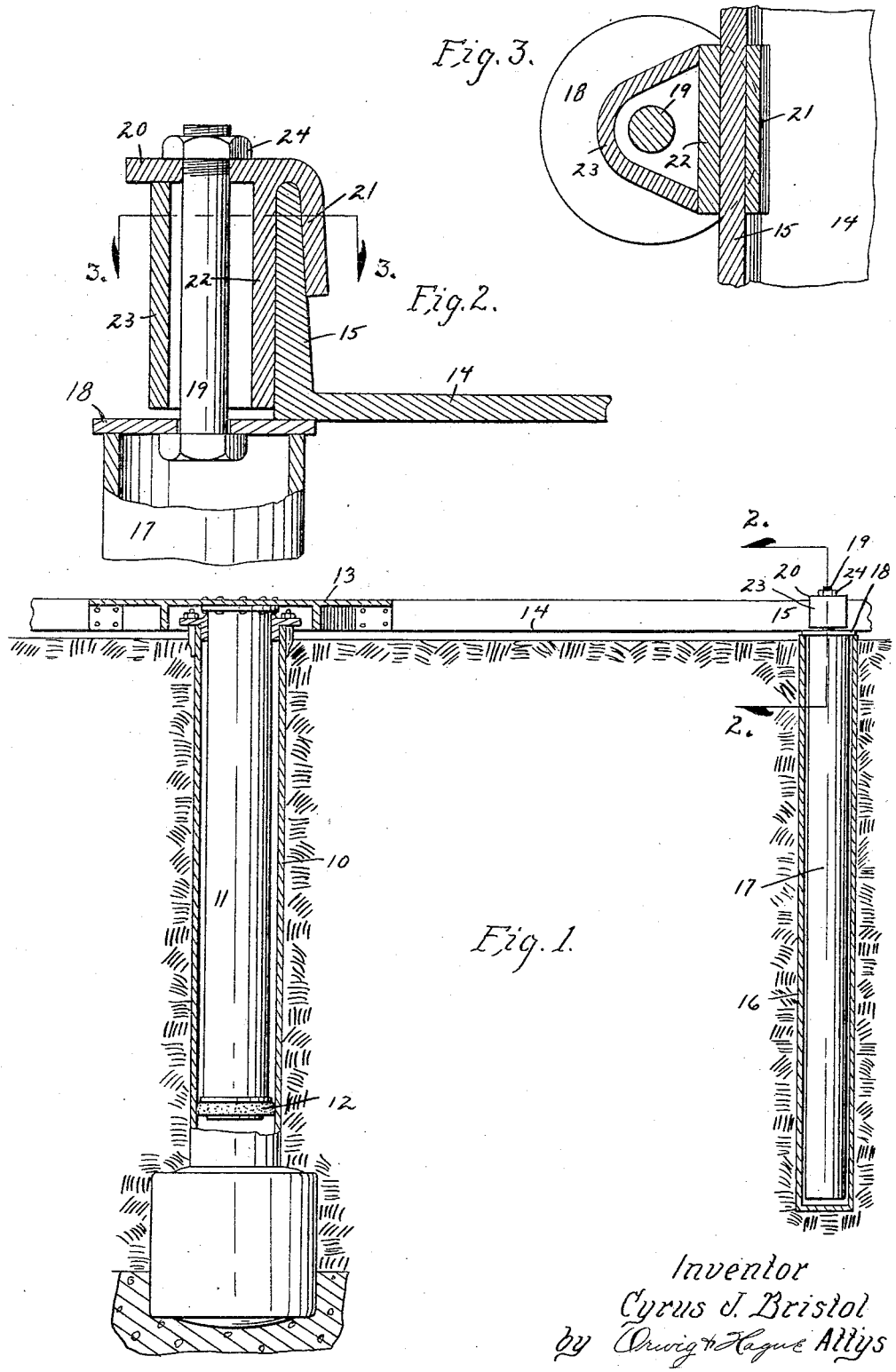
Inventor
Cyrus J. Bristol
by Orwig & Hague Attys

Patented Nov. 1, 1932

1,885,984

UNITED STATES PATENT OFFICE

CYRUS J. BRISTOL, OF DES MOINES, IOWA, ASSIGNOR TO GLOBE MACHINERY & SUPPLY COMPANY, OF DES MOINES, IOWA, A CORPORATION OF IOWA

GUIDE DEVICE FOR AUTOMOBILE LIFTS

Application filed June 23, 1930. Serial No. 463,150.

My invention relates to that class of automobile lifts in which there is employed a single fluid pressure jack with means fixed to the top of the piston for receiving and supporting an automobile, and when the piston is elevated, the automobile may be held in an elevated position for servicing its under side. In automobile lifts of this character the lift when elevated may be free to rotate.

The object of my invention is to provide means of simple, durable and inexpensive construction, which may be readily, quickly and easily applied to automobile lifts already installed, and which will prevent rotary movement of the automobile lift when elevated, and yet not in any way interfere with the up and down movements of the lift, so that lifts of this character may be installed close to the wall of a building, or a number of them may be installed within a building of limited area, and whereby the lifts will be prevented, with the use of my improvement, from rotating when elevated and from striking objects close to the sides of the lift.

My invention consists in the construction, arrangement and combination of the various parts of the device, whereby the objects contemplated are attained, as hereinafter more fully set forth, pointed out in my claims, and illustrated in the accompanying drawing, in which:

Figure 1 shows a vertical, central, longitudinal sectional view illustrating a portion of an automobile lift of ordinary construction, and also my improved nonrotating guide attachment.

Figure 2 shows an enlarged detail view of the upper end of my improved guide device with a portion of an automobile track rail to which the guide device is clamped; and Figure 3 shows a horizontal sectional view on the line 3—3 of Figure 2.

Referring to the accompanying drawing I have used the reference numeral 10 to indicate the cylinder part of a fluid pressure jack, and 11 the piston, having at its lower end a cup-shaped leather 12. Fixed to the top of the piston is the lift head 13 and attached to the head are the trough-shaped rails 14 for receiving automobile wheels. These rails, as shown in Figure 2, have upwardly projecting flanges 15 at their sides. When a fluid pressure jack of this character is elevated, the head 13 may be freely rotated.

For the purpose of guiding the up and down movements of the head member 13 in a straight vertical line, and for preventing rotary movements, I have provided a guide device consisting of a cylindrical casing 16 set into the ground near the outer end of one of the automobile wheel rails 14, the upper end of which is slightly elevated above the floor surface, as shown in Figure 1.

Slidingly mounted within the casing 16 is a cylindrical guide member 17 loosely fitted so it will have free up and down movement. Welded to the top of the guide member 17 is a circular plate 18, and extended upwardly through this plate is a bolt 19 having its head below the plate. Mounted upon the bolt 19 is a head member comprising a top plate 20, through which the bolt extends, and a hook member 21 designed to overlap the flange 15, as shown in Figure 2. A flat plate 22 is formed in the head member spaced apart from the hook 21 far enough to receive the flange 15 between the hook and the plate, and on the opposite side of the bolt there is a brace member 23 surrounding the bolt and secured to the plate 22 at its ends, as shown in Figure 3. A nut 24 is provided for the bolt.

In practical use the cylindrical guide member 17 is set into the casing 16, the nut 24 is removed, and the guide head member is slipped up over the bolt. Then the plate 18 is moved to position beneath the rail 14, as shown in Figure 3. Then the guide head is replaced in position with the hook 21 overlapping the flange 15, and then the nut 24 is placed in position and tightened. In this manner the upper end of the cylindrical guide is firmly but detachably connected with the automobile wheel rail 14.

The lift may then be raised and lowered in the ordinary manner, without any interference by the guide device, but the guide device securely holds the lift against rotary movement.

In the event that it should be desired to turn the lift, the guide head may be removed and the lift may be freely turned.

I claim as my invention:

1. A guide device for automobile lifts, comprising a casing designed to be embedded in the ground and having an open upper end, a guide member slidingly movable within the casing, a plate secured to the top of the guide member, a bolt extended upwardly through the plate, a head member having said bolt extended upwardly through it, said head member being provided with a hook at one side designed to overlap the flange of an automobile wheel rail to clamp the rail between the hook and the said plate, and a nut on said bolt to engage the top of the head member.

2. The combination with an automobile lift comprising a vertically movable piston and a rotatable automobile supporting frame at the top of the piston, of a guide device comprising a casing designed to be embedded in the ground and having an open upper end, a guide member slidingly movable within the casing, a head member provided with a hook at one side designed to engage a portion of the automobile supporting frame, and means for detachably connecting said head member with said guide member.

Des Moines, Iowa, June 17, 1930.

CYRUS J. BRISTOL.